US011922880B2

(12) United States Patent
Lee et al.

(10) Patent No.: US 11,922,880 B2
(45) Date of Patent: Mar. 5, 2024

(54) CURRENT SUPPLY CIRCUIT AND DISPLAY DEVICE INCLUDING THE SAME

(71) Applicant: LX Semicon Co., Ltd., Daejeon (KR)

(72) Inventors: Jong Min Lee, Daejeon (KR); Kyeong Rok Lee, Daejeon (KR); Sang Suk Kim, Daejeon (KR); Jang Su Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/992,474

(22) Filed: Nov. 22, 2022

(65) Prior Publication Data

US 2023/0178024 A1 Jun. 8, 2023

(30) Foreign Application Priority Data

Dec. 8, 2021 (KR) ........................ 10-2021-0174843

(51) Int. Cl.
*G09G 3/3241* (2016.01)

(52) U.S. Cl.
CPC ..... *G09G 3/3241* (2013.01); *G09G 2310/027* (2013.01); *G09G 2320/0233* (2013.01)

(58) Field of Classification Search
CPC ........... G09G 3/3241; G09G 2310/027; G09G 2320/0233
See application file for complete search history.

(56) References Cited

U.S. PATENT DOCUMENTS

2005/0057457 A1* 3/2005 Date .................... G09G 3/3283 345/76
2008/0224967 A1* 9/2008 Huang ................... H05B 45/48 345/82
2009/0189846 A1* 7/2009 Nishikawa ........... G09G 3/3406 345/102
2011/0221790 A1* 9/2011 Takahashi ............. H05B 45/46 345/102
2017/0061865 A1* 3/2017 Park ....................... G09G 3/325

FOREIGN PATENT DOCUMENTS

KR 101254595 B1 4/2013
KR 20160058291 A 5/2016

* cited by examiner

*Primary Examiner* — Kwang-Su Yang
(74) *Attorney, Agent, or Firm* — ROTHWELL, FIGG, ERNST & MANBECK, P.C.

(57) ABSTRACT

A current supply circuit according to the present disclosure may include a voltage/current converter configured to convert, into a data current, a data voltage received from a data driving circuit and a first current mirror circuit configured to mirror the data current so that a light-emitting diode (LED) current flows into an LED array. The data current may be adjusted based on a greyscale value of the LED array.

18 Claims, 9 Drawing Sheets

300

CURRENT SUPPLY CIRCUIT AND DISPLAY DEVICE INCLUDING THE SAME

CROSS REFERENCE TO RELATED APPLICATION

This application claims priority to Republic of Korea Patent Application No. 10-2021-0174843 filed on Dec. 8, 2021, which is hereby incorporated by reference in its entirety.

BACKGROUND

1. Field of Technology

The present embodiment relates to a current supply circuit and a display device including the same.

2. Description of the Prior Art

A display device may include various types of panels, such as organic light-emitting diodes and liquid crystal displays, and includes a data driving circuit, a gate driving circuit, a current supply circuit, etc. for driving pixels that are disposed in a panel.

The data driving circuit determines a data voltage or a data current based on image data, and controls brightness of a pixel by supplying a pixel of the panel with the data voltage or the data current through a data line.

A light-emitting diode (LED) voltage or an LED current that is transmitted to the LED of the pixel is determined in accordance with the size of the data voltage or the data current transmitted by the data driving circuit. As brightness of a panel is determined by the LED voltage or the LED current, it is necessary to properly adjust the LED voltage or current based on required brightness of a display device.

In particular, if an LED current having a given level or change rate regardless of a greyscale value of a pixel is supplied, images corresponding to respective greyscale areas would not have proper resolutions and unnecessary power would be consumed.

The discussions in this section are only to provide background information and do not constitute an admission of prior art.

SUMMARY

In such a background, an aspect of the present disclosure is to provide a circuit capable of properly compensating for a data voltage or a data current so that desired brightness of a pixel can be implemented in a display device and a display device including the same.

Furthermore, another aspect of the present disclosure is to provide a circuit capable of adjusting resolution for each greyscale section of the pixel by converting a data voltage in the form of a data current by using a voltage/current converter and controlling the converted data current, and a display device including the same.

Furthermore, still another aspect of the present disclosure is to provide a circuit capable of improving resolution in a way to reduce a change in the data current according to the input of a data voltage by reducing a current mirror ratio in a low greyscale section and adjusting a driving area of an LED by additionally supplying a compensation current in a high greyscale section and a display device including the same.

In an aspect, a current supply circuit may include a voltage/current converter configured to convert a data voltage, received from a data driving circuit, into a data current; and a first current mirror circuit configured to mirror the data current so that a light-emitting diode (LED) current flows into an LED array. The data current may have a first change rate in a first greyscale section and a second change rate in a second greyscale section in relation to the data voltage.

In another aspect, a current supply circuit may include a first current mirror circuit configured to mirror a data current through first and second transistors and to output a mirrored data current to a light-emitting diode (LED); a voltage/current converter including an amplifier configured to receive a data voltage through a first input terminal thereof and to output the data voltage and a third transistor configured to receive the data voltage output from the amplifier through a gate terminal thereof and to generate the data current, and a compensation current generation circuit configured to change the data current by supplying a compensation current to the first current mirror circuit.

In still another aspect, in a data processing circuit for controlling a light-emitting diode (LED) current transmitted to an LED of a display device, the display device may include a first current mirror circuit configured to generate the LED current corresponding to a data current; and a compensation current generation circuit configured to supply a compensation current to the first current mirror circuit. The data processing circuit may control the LED current by transmitting a current control signal to change the data current or the compensation current.

As described above, according to the present embodiment, it is possible to improve resolution by incorporating characteristics of the pixel for each greyscale in a display device and to reduce consumption power that is consumed in a process of driving the display device.

Furthermore, according to the present embodiment, it is possible to finely adjust the driving of an LED and brightness of a pixel for each greyscale section.

Furthermore, according to the present embodiment, compatibility with the existing display device driving condition can be secured, and resolution in a low greyscale area can also be improved.

DETAILED DESCRIPTION OF EMBODIMENTS

Figure 1:
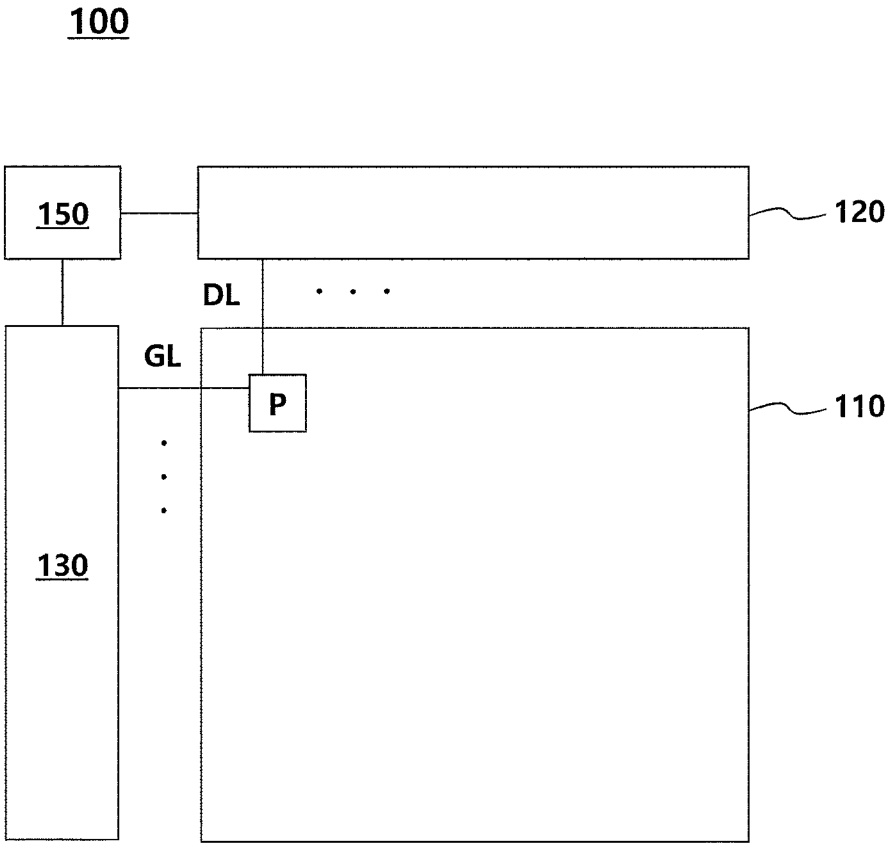
FIG. 1 is a diagram illustrating a construction of a display device according to an embodiment of the present disclosure.

FIG. 1 is a diagram illustrating a construction of a display device according to an embodiment of the present disclosure.

Referring to FIG. 1, a display device 100 may include a panel 110, a data driving circuit 120, a gate driving circuit 130, a data processing circuit 150, etc.

A plurality of data lines DL, a plurality of gate lines GL, etc. may be disposed in the panel 110. A plurality of pixels P may be disposed in the panel 110.

The panel 110 may have a type in which one or more of a display panel (not illustrated) and a touch panel (not illustrated) are separated from each other or integrated. Various panels, such as a Liquid Crystal Display (LCD), an Organic Light Emitting Diode (OLED), a Light Emitting Diode (LED), and a mini-LED, may be used as the panel 110, but the present disclosure is not limited thereto.

The pixels P that are disposed in the panel 110 may include one or more LEDs and one or more transistors. Brightness of the pixel P or resolution may be determined by a voltage or a current that is transmitted to the pixel P.

If the panel 110 is an LCD, the LED may be defined as a backlight, and brightness of the panel 110 may be determined by an emission power of the LED.

The data driving circuit 120 may supply a data voltage to the pixel P through the data line DL. The data voltage supplied to the data line DL may be transmitted to the pixel P connected to the data line DL in response to a scan signal of the gate driving circuit 130. The data driving circuit 120 may be defined as a source driver, if necessary.

The data driving circuit 120 may transmit an analog signal to the pixel P in the form of a voltage or current, may further include a voltage/current converter (not illustrated), etc. The data driving circuit 120 may change the state of a data voltage or a data current and supply the changed data voltage or data current to an LED, etc. of the pixel P.

The data driving circuit 120 may receive an analog signal (e.g., a voltage or a current) that is formed in each pixel P through a sensing line SL (not illustrated), and may determine characteristics of the pixel P. Furthermore, the data driving circuit 120 may sense a change in characteristics of each pixel P over time, and may transmit the sensed characteristics to the data processing circuit 150.

Each pixel P may be defined as a pixel electrode or a common electrode. Brightness of the pixel P may be digitized as a greyscale value, and may become a reference point for controlling brightness of the panel 110. For example, a data voltage ($V_{data}$) corresponding to a greyscale value may be obtained. Brightness of the panel 110 may be adjusted based on correlation between the data voltage ($V_{data}$) and a data current ($I_{data}$).

The data driving circuit 120 has a form in which a voltage is supplied to an LED, and may have a driving chip form as a form of a plurality of integrated circuits. For example, a plurality of driving chips may transmit an analog signal to an LED in the form of a data voltage.

A pixel sensing circuit (not illustrated) may include an Analog Front End (AFE), Sample and Hold (S/H), an Amplifier (AMP), and an Analog Digital Converter (ADC).

The AFE (not illustrated) may sense the pixel P, may process a current transmitted by the pixel P, and may form a sensing voltage (Vi).

The S/H (not illustrated) may separate the AFE and the AMP in terms of a signal, may temporarily store the sensing voltage (Vi) output by the AFE, and may input the sensing voltage (Vi) or a difference (ΔVi) between the sensing voltage and a reference voltage to the AMP.

The AMP (not illustrated) may amplify the sensing voltage (Vi) transmitted to an input terminal thereof or the difference (ΔVi) between the sensing voltage and the reference voltage, and may transmit the amplified sensing voltage (Vi) or difference (ΔVi) to the ADC.

The ADC (not illustrated) may convert the output voltage of the AMP into a digital signal (Ao).

The gate driving circuit 130 may supply the gate line GL with a scan signal having a turn-on voltage or a turn-off voltage. When the scan signal having the turn-on voltage is supplied to the pixel P, the pixel P is connected to the data line DL. When the scan signal having the turn-off voltage is supplied to the pixel P, a connection between the pixel P and the data line DL is released. The gate driving circuit 130 may be defined as a gate driver, if necessary. The scan signal of the gate driving circuit 130 may define turn-on timing or turn-off timing of the transistor of the pixel P.

The data processing circuit 150 may supply various control signals to the data driving circuit 120 and the gate driving circuit 130. The data processing circuit 150 may transmit a data control signal (DCS) that controls the data driving circuit 120 so that the data driving circuit 120 supplies each pixel P with a data voltage based on each timing, or may transmit a gate control signal (GCS) to the gate driving circuit 130. The data processing circuit 150 may be defined as a timing controller (T-Con), if necessary.

The data processing circuit 150 may transmit, to the data driving circuit 120, image data RGB that has been changed from image data received from the outside based on a data signal format that is used in the data driving circuit 120.

Furthermore, the data processing circuit 150 may generate signals for controlling various circuits, such as a transistor that is included in a current supply circuit (not illustrated) of the panel 110, and may transmit the signals to the panel 110.

Brightness of the LED of the panel 110 is controlled by the current supply circuit (not illustrated). Accordingly, the data processing circuit 150 may determine brightness of the pixel P by controlling the current supply circuit.

The data processing circuit 150 may define some of all LEDs as a block, and may finely control a greyscale value for each target location of the panel 110 by selectively controlling the LEDs of each block.

In this specification, a transistor (not illustrated) may be a Field Effect Transistor (FET), and may be applied to various types such as a Bipolar Junction Transistor (BJT).

Figure 2:
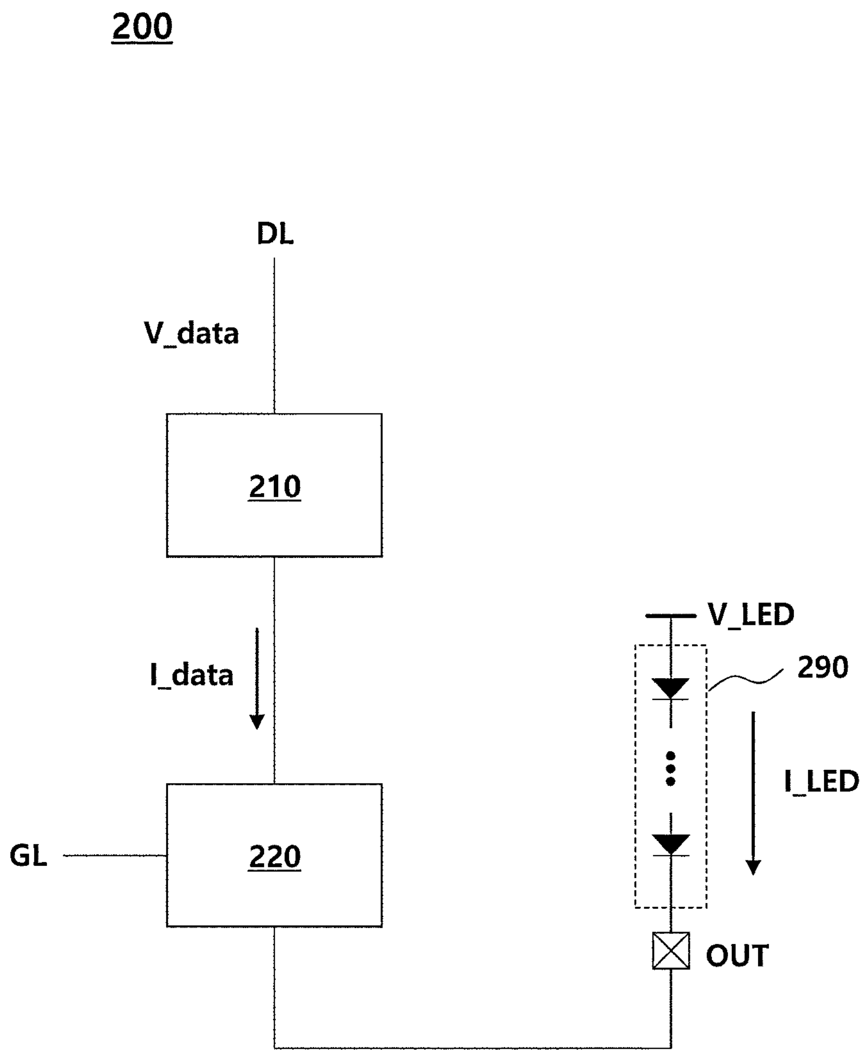
FIG. 2 is a first exemplary diagram illustrating a signal flow of a current supply circuit according to an embodiment of the present disclosure.

FIG. 2 is a first exemplary diagram illustrating a signal flow of a current supply circuit according to an embodiment of the present disclosure.

Figure 3:
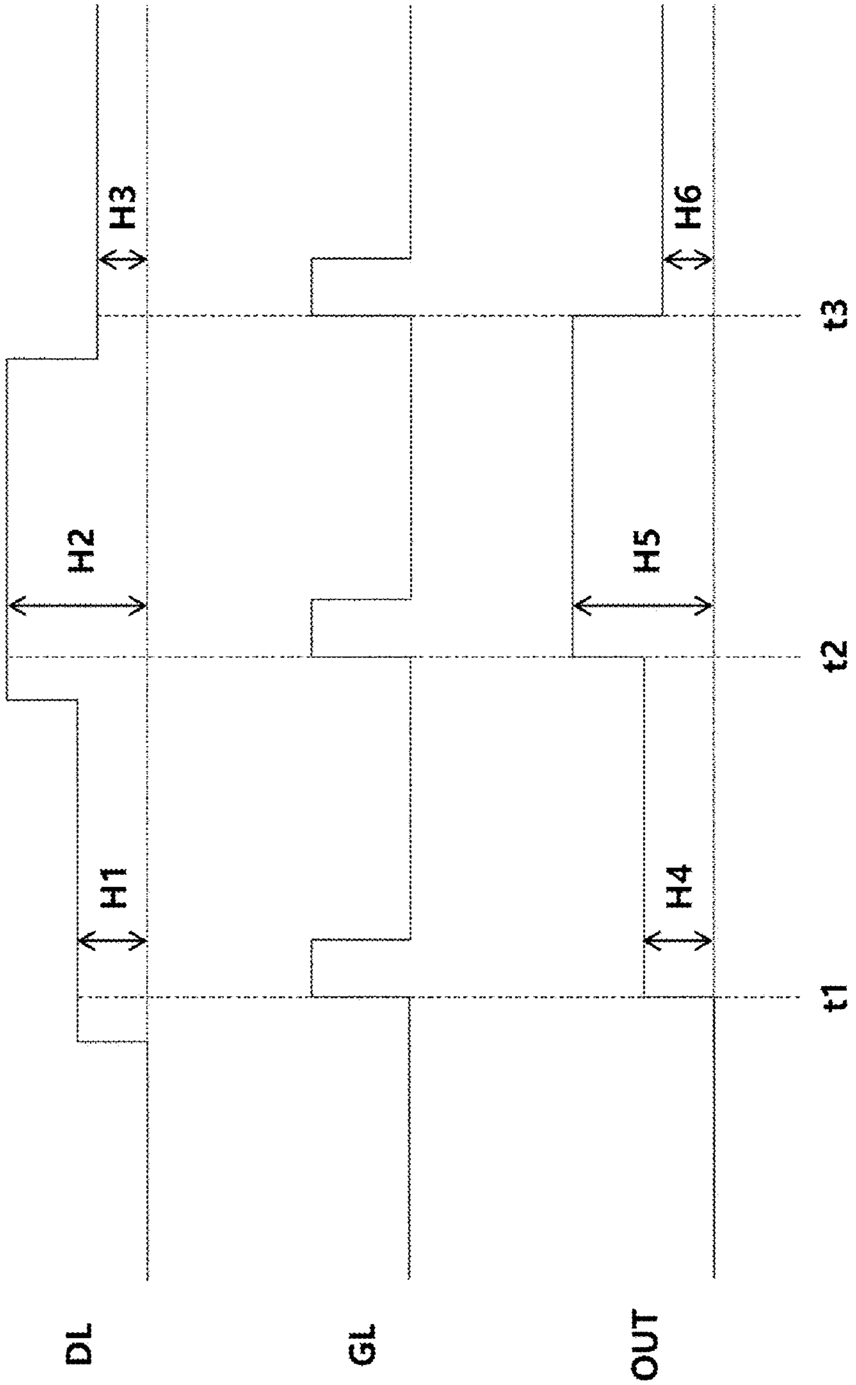
FIG. 3 is a diagram illustrating signal timing of the current supply circuit according to an embodiment of the present disclosure.

FIG. 3 is a diagram illustrating signal timing of the current supply circuit according to an embodiment of the present disclosure.

Referring to FIG. 2, a current supply circuit 200 may include a voltage/current converter 210, a current mirror circuit 220, etc.

A signal flow of the current supply circuit 200 may be defined by a data voltage that is transmitted through the data line DL and a scan signal that is transmitted through the gate line GL.

The current supply circuit 200 may receive a data voltage (V_data) from the data driving circuit 120 or may receive a data current (I_data) converted by a voltage/current converter 210. In this case, the data voltage (V_data) and the data current (I_data) may be signals that are converted from a voltage or a current transmitted by the data driving circuit 120 and that are used for an operation of the current supply circuit 200.

The voltage/current converter 210 may be omitted depending on the type of analog signal that is transmitted by the data driving circuit 120. For example, if a signal transmitted by the data driving circuit 120 is the data current (I_data), the voltage/current converter 210 may be omitted, and the data current (I_data) may be directly transmitted to the current mirror circuit 220.

The current mirror circuit 220 may receive a scan signal from the gate driving circuit 130, and may transmit, to an LED 290, an output voltage or an output current corresponding to corresponding timing.

The output voltage or output current of the current mirror circuit 220 may correspond to the size of the data voltage (V_data) or the data current (I_data).

The size of a current that is transmitted to the LED 290 may be defined by a voltage at the output stage OUT of the current mirror circuit 220 and an LED voltage (V_LED) at one end of the LED 290. Furthermore, the size of an LED current (I_LED), that is, a current transmitted to the LED 290, may be defined based on a state of a transistor that is connected to the output stage of the current mirror circuit 220.

FIG. 2 is a diagram illustrating a signal flow for controlling brightness of the LED 290 by the analog signal of the current supply circuit 200. The voltage/current converter 210 or the current mirror circuit 220 may be omitted or replaced with another circuit.

Referring to FIG. 3, pieces of timing of an input signal and output signal of the current supply circuit may be compared.

The current mirror circuit 220 may be supplied with a data voltage or a data current through the data line DL, and may be supplied with a scan signal through the gate line GL.

An output voltage may be generated from a signal of the output stage OUT of the current mirror circuit 220 in accordance with pulse timing t1, t2, and t3 of the scan signal of the gate line GL.

The signal of the output stage OUT of the current mirror circuit 220 may be a signal that is output by mirroring the data voltage or the data current that is transmitted to the data line DL. In this case, the current mirror circuit 220 may be a current mirror circuit with which a plurality of transistors is coupled, but the present disclosure is not limited thereto.

The sizes H4, H5, and H6 of the signal of the output stage OUT of the current mirror circuit 220 may be the same as the sizes H1, H2, and H3 of the data voltage or the data current, and may be defined to have a corresponding relation having given correlation or a signal size ratio having a given multiple.

The input signal and output signal of the current mirror circuit 220 illustrate the size and waveform of each signal, and the form thereof is not limited to the form of FIG. 3.

The current mirror circuit 220 may further include a voltage compensation circuit (not illustrated) in order to maintain a desired ratio of the input signal and the output signal. The sizes and states of the input signal and the output signal may be changed or compensated for by a control signal of the data processing circuit 150.

Figure 4:
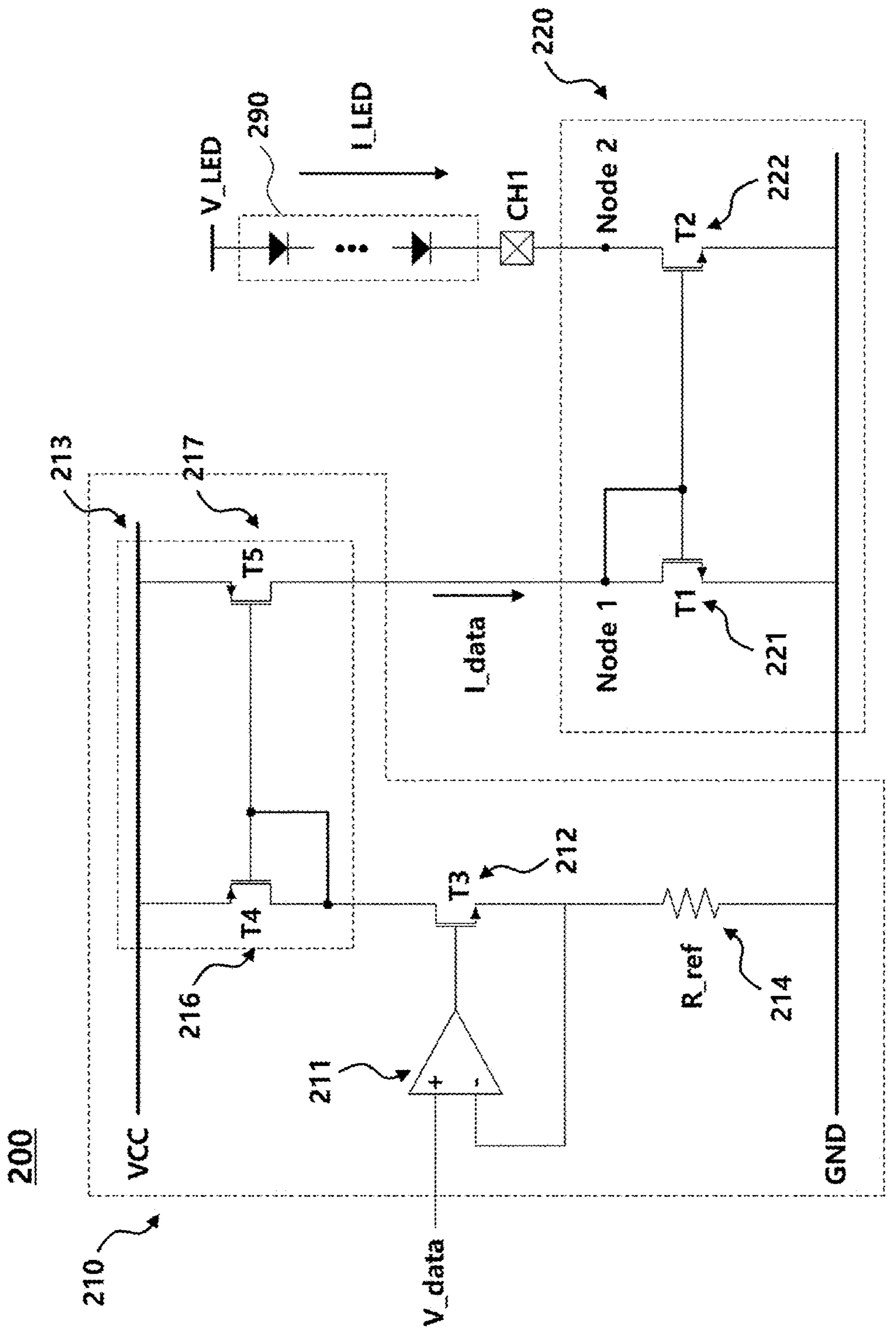
FIG. 4 is a first exemplary diagram of the current supply circuit according to an embodiment of the present disclosure.

FIG. 4 is a first exemplary diagram of the current supply circuit according to an embodiment of the present disclosure.

Referring to FIG. 4, the current supply circuit 200 may include a voltage/current converter 210, a first current mirror circuit 220, an LED 290, etc.

The first current mirror circuit 220 may include a first transistor 221 connected to a first node Node 1 and a second transistor 222 connected to a second node Node 2 so that a current flows into an LED array by mirroring a data current (I_data).

The first transistor 221 may directly receive a data voltage (V_data) or the data current (I_data) from a data driving circuit (not illustrated), or may receive a signal that is obtained by converting or compensating for a data voltage or a data current by the voltage/current converter 210.

One terminal of the first transistor 221 may be connected to the gate terminal of the first transistor 221 and the gate terminal of the second transistor 222 in common, and may form the first current mirror circuit 220. In this case, the first transistor 221 may stably deliver the received signal to the second transistor 222.

The second transistor 222 may receive the signal from the first transistor 221, and may supply a current to the LED 290. The second transistor 222 may be connected to the gate terminal of the first transistor 221, and may output an LED current (I_LED) corresponding to the data current (I_data).

The second transistor 222 may transmit, to the LED 290, the data current (I_data) that is transmitted to the first transistor 221 by mirroring the data current (I_data). In this case, the mirroring may include outputting a current having the same size as the received current, but may be defined as outputting a signal having a corresponding relation having given correlation or a signal size ratio having a given multiple.

The first and second transistors 221 and 222 may be FETs or BJTs, but the present disclosure is not limited thereto.

The voltage/current converter 210 may be disposed between a data driving circuit (not illustrated) and the first transistor 221, and may convert the data voltage (V_data) into the data current (I_data), but may be omitted if the type of signal transmitted by the data driving circuit (not illustrated) is the data current (I_data).

The voltage/current converter 210 may include an amplifier 211, a third transistor 212, a second current mirror circuit 213, a reference resistor 214, etc. in order to convert, into the data current (I_data), the data voltage (V_data) received from the data driving circuit.

The amplifier 211 may receive the data voltage (V_data) through a first input terminal thereof, for example, a plus input terminal thereof, and may generate an output voltage. The output terminal of the amplifier 211 may be connected to the third transistor 212, and may provide an output voltage. A second input terminal of the amplifier 211, for example, a minus input terminal, may be connected to one terminal of the third transistor 212.

One end of the reference resistor (R_ref) 214 may be connected to a common node of the second input terminal of the amplifier 211 and one terminal of the third transistor 212, and the other end thereof may have a ground voltage (GND).

The second current mirror circuit 213 may be a current mirror circuit that is formed by a fourth transistor 216 and a fifth transistor 217, and may have various current mirroring ratios depending on sizes and parameter conditions of the fourth transistor 216 and the fifth transistor 217.

As illustrated in FIG. 4, the second current mirror circuit 213 may receive a power supply voltage (VCC) through one ends of the fourth and fifth transistors 216 and 217, may receive a voltage of one terminal of the third transistor 212 through the other end thereof, and may transmit the voltage to the gate terminal of the fourth transistor 216. In this case, the power supply voltage (VCC) may be an arbitrary voltage transmitted by a power source, and may be a separate signal different from the data voltage (V_data).

The second current mirror circuit 213 may generate the data current (I_data) by mirroring a current that flows into one terminal of the third transistor 212, and may transmit the data current (I_data) to the first current mirror circuit 220 through the first node Node 1.

The second current mirror circuit 213 may change a change gradient of the data voltage (V_data) versus the data current (I_data) by adjusting its mirroring ratio. For example, the second current mirror circuit 213 may reduce a change in the data current (I_data) according to the data voltage (V_data) in a low greyscale area, and may increase a change in the data current (I_data) according to the data voltage (V_data) in a high greyscale area. Accordingly, resolution higher than that of the existing circuits can be implemented.

The LED 290 may be an individual element, but may be defined by a plurality of LED arrays consisting of one channel CH1. Furthermore, the LED 290 may form a panel by including a plurality of channels.

The LED 290 or the pixel may have various brightness values. For example, numerical values, such as 0 to 255, may be defined as greyscale values, and may indicate brightness. The greyscale value of the LED 290 or the pixel may be defined as a greyscale section that is divided into a first greyscale section and a second greyscale section. The data current (I_data) and the LED current (I_LED) in the first greyscale section and the second greyscale section may be defined.

The voltage/current converter 210, the first transistor 221, and the second transistor 222 may receive the same voltage, for example, a ground voltage, through arbitrary one ends thereof, but the present disclosure is not limited thereto. In this case, the circuits 210, 221, and 222 may receive the same voltage through one ends thereof, and may set a reference point for the transmission of a signal.

Figure 5:
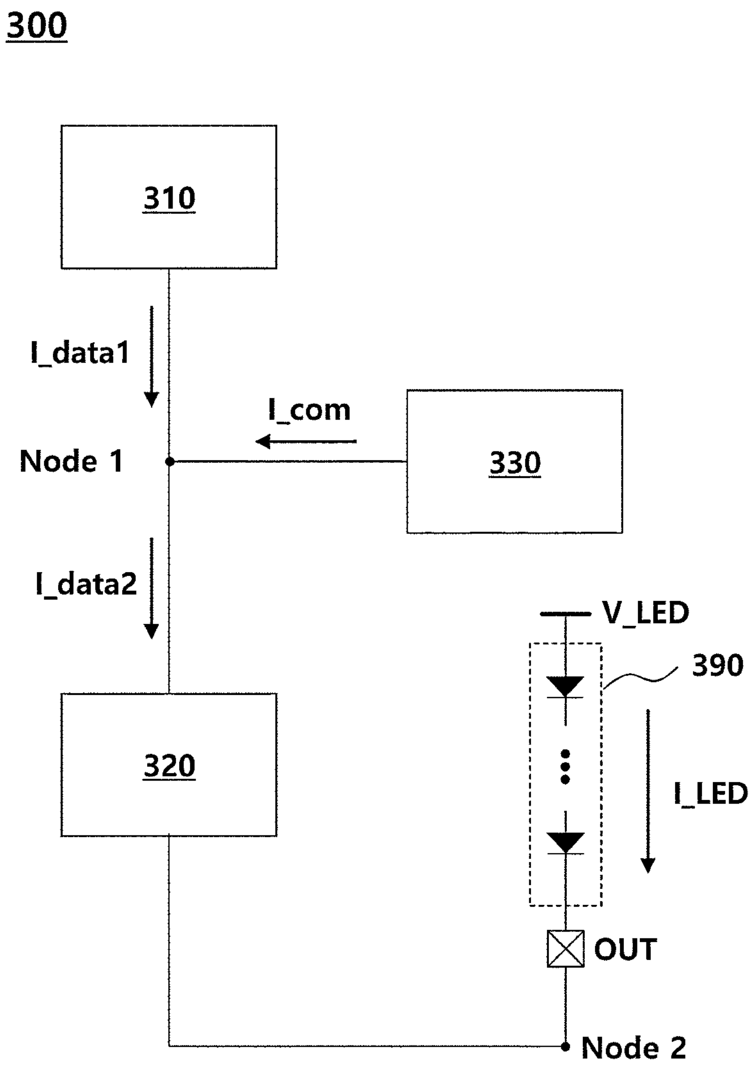
FIG. 5 is a second exemplary diagram illustrating a signal flow of a current supply circuit according to an embodiment of the present disclosure.

FIG. 5 is a second exemplary diagram illustrating a signal flow of a current supply circuit according to an embodiment of the present disclosure.

Referring to FIG. 5, a signal flow of a current supply circuit 300 may be determined by a voltage/current converter 310, a first current mirror circuit 320, a compensation current generation circuit 330, etc.

The voltage/current converter 310 may receive a data voltage (V_data) from a data driving circuit (not illustrated), may convert the data voltage (V_data) into a first data current (I_data1), and may output the first data current (I_data1).

The voltage/current converter 310 may form a common node, for example, a first node Node 1 along with the first current mirror circuit 320, and may transmit the first data current (I_data1) through the common node. If the compensation current generation circuit 330 is not present or does not transmit a compensation current (I_com), the first data current (I_data1) may be the same as a second data current (I_data2).

The first current mirror circuit 320 may receive the second data current (I_data2), and may transmit a corresponding output voltage or output current to an LED 390 through a second node Node 2. The output voltage or output current of the first current mirror circuit 320 may have the same size as a data voltage (V_data) or a data current (I_data) or may have given correlation therewith.

The size of an LED current (I_LED) that is transmitted to the LED 390 may be defined by a voltage of the output stage OUT of the first current mirror circuit 320 and the LED voltage (V_LED) at one end of the LED 390.

The compensation current generation circuit 330 may adjust the second data current (I_data2) that is transmitted to the first current mirror circuit 320 in a way to compensate for the first data current (I_data1) by transmitting the compensation current (I_com) to the first node. In this case, the first node may be a common node at which the voltage/current converter 310, the first current mirror circuit 320, and the compensation current generation circuit 330 are connected in common.

Brightness of the pixel P can be more finely controlled by compensating for limited characteristics of the first data current (I_data1) by the compensation current generation circuit 330. Resolution of the LED can be improved in a low greyscale section by a combination of the compensation current (I_com) supplied by the compensation current generation circuit 330 and the first data current (I_data1). Brightness of a backlight can be adjusted for each section by supplying the LED with a sufficient current in a high greyscale section.

If the data voltage (V_data) and the first data current (I_data1) are increased with linear correlation in the voltage/current converter 310, the compensation current generation circuit 330 may independently or individually adjust the gradient of the second data current (I_data2) or the intensity of a current by adjusting the change rate or size of the compensation current (I_com).

For example, in order to compensate for the LED current (I_LED) that has been reduced in a low greyscale area, the compensation current generation circuit 330 may supply a current corresponding to an insufficient current in a high greyscale area in the form of a compensation current. In this case, an improved technical effect can be achieved in the existing LED driving area in a way to improve current resolution in a low greyscale area and to compensate for an insufficient current value in a high greyscale area by a combination of the voltage/current converter 310 and the compensation current generation circuit 330.

Figure 6:
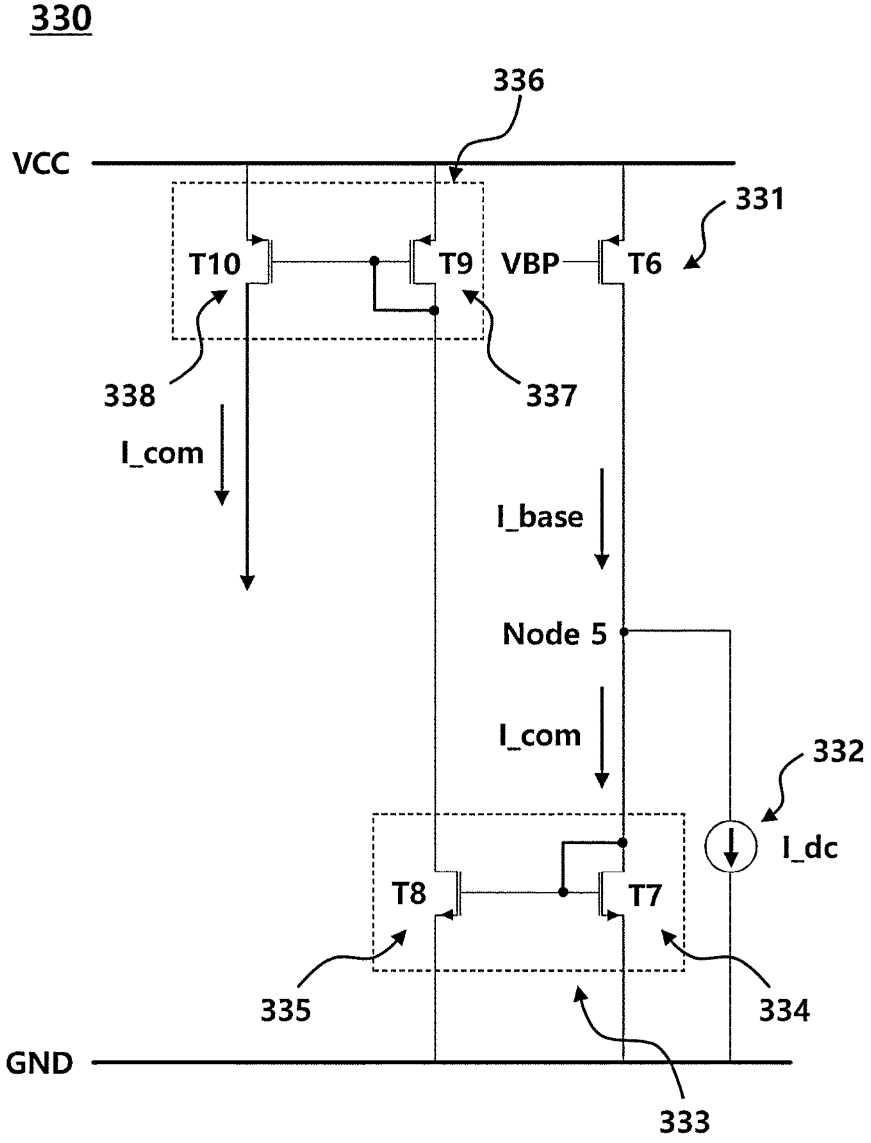
FIG. 6 is a diagram illustrating a compensation current generation circuit according to an embodiment of the present disclosure.

FIG. 6 is a diagram illustrating a compensation current generation circuit according to an embodiment of the present disclosure.

Referring to FIG. 6, a compensation current generation circuit 330 may include a sixth transistor 331, a direct current source 332, a third current mirror circuit 333, a fourth current mirror circuit 336, etc.

The sixth transistor 331 may receive a bypass voltage VBP through a gate terminal thereof, and may output a base current (I_base) through one terminal thereof. For example, the gate terminal of the sixth transistor 331 may be connected to the gate terminal of the fourth transistor 216 or the fifth transistor 217 in FIG. 4. In this case, the size of an analog signal and timing at which the analog signal is transmitted may be identically maintained. It may be similarly understood that the bypass voltage VBP is formed because a common node of a fourth transistor and a fifth transistor, for example, a fourth node Node 4, is electrically connected to the gate terminal of the sixth transistor 331 in FIG. 7.

The bypass voltage VBP of the sixth transistor 331 may be related to the data voltage (V_data), and may be defined as a current source that outputs the base current (I_base).

The direct current source 332 is a current source that transmits a direct current (I_dc), and may be connected to one terminal, for example, the source terminal or drain terminal of the sixth transistor 331 at a fifth node Node 5. The direction of the direct current (I_dc) may be changed, if necessary.

The base current (I_base) transmitted by the sixth transistor 331 and the direct current (I_dc) transmitted by the direct current source 332 may be added together at the fifth node Node 5, thus forming the compensation current (I_com). The size and change rate of the compensation current (I_com) may be determined by the base current (I_base) and the direct current (I_dc) transmitted by the sixth transistor 331 and the direct current source 332, respectively.

The base current (I_base) that is supplied by the sixth transistor 331 may be linearly changed in response to a change in the data voltage (V_data). The direct current (I_dc) that is supplied by the direct current source 332 may have a given size. In this case, the compensation current (I_com) having a desired size and gradient may be generated by a combination of the base current (I_base) and the direct current (I_dc).

The third current mirror circuit 333 may receive the compensation current (I_com), and may transmit the compensation current (I_com) to the fourth current mirror circuit 336 by mirroring the compensation current (I_com) through a seventh transistor 334 and an eighth transistor 335. In this case, the third current mirror circuit 333 may transmit, to the fourth current mirror circuit 336, a current that has the same size as or a size different from that of the compensation current (I_com) and has given correlation therebetween.

The fourth current mirror circuit 336 may transmit, to the first current mirror circuit 320, the current received from the third current mirror circuit 333 again by mirroring the received current through a ninth transistor 337 and a tenth transistor 338. The fourth current mirror circuit 336 may transmit, to the first current mirror circuit 320, a current that has the same size as or a size different from that of the compensation current (I_com) and that has given correlation therebetween.

The third and fourth current mirror circuits 333 and 336 can overcome a structural limit of a current by obtaining the compensation current (I_com) as the sum of output currents of a first current source, for example, the sixth transistor 331 and a second current source, for example, the direct current source 332 and mirroring the compensation current (I_com) at a given ratio by a plurality of transistors. The third and fourth current mirror circuits 333 and 336 may be omitted if necessary, and the compensation current (I_com) may be directly transmitted to the first current mirror circuit 320. One terminal of the first current source, for example, the sixth transistor 331 and one terminal of the second current source, for example, the direct current source 332 may be electrically connected, and may form a common node.

The third current mirror circuit 333 or the fourth current mirror circuit 336 may obtain a required gradient of the data current (I_data) for each greyscale by adjusting the mirroring ratio of the compensation current (I_com) to a desired ratio.

Figure 7:
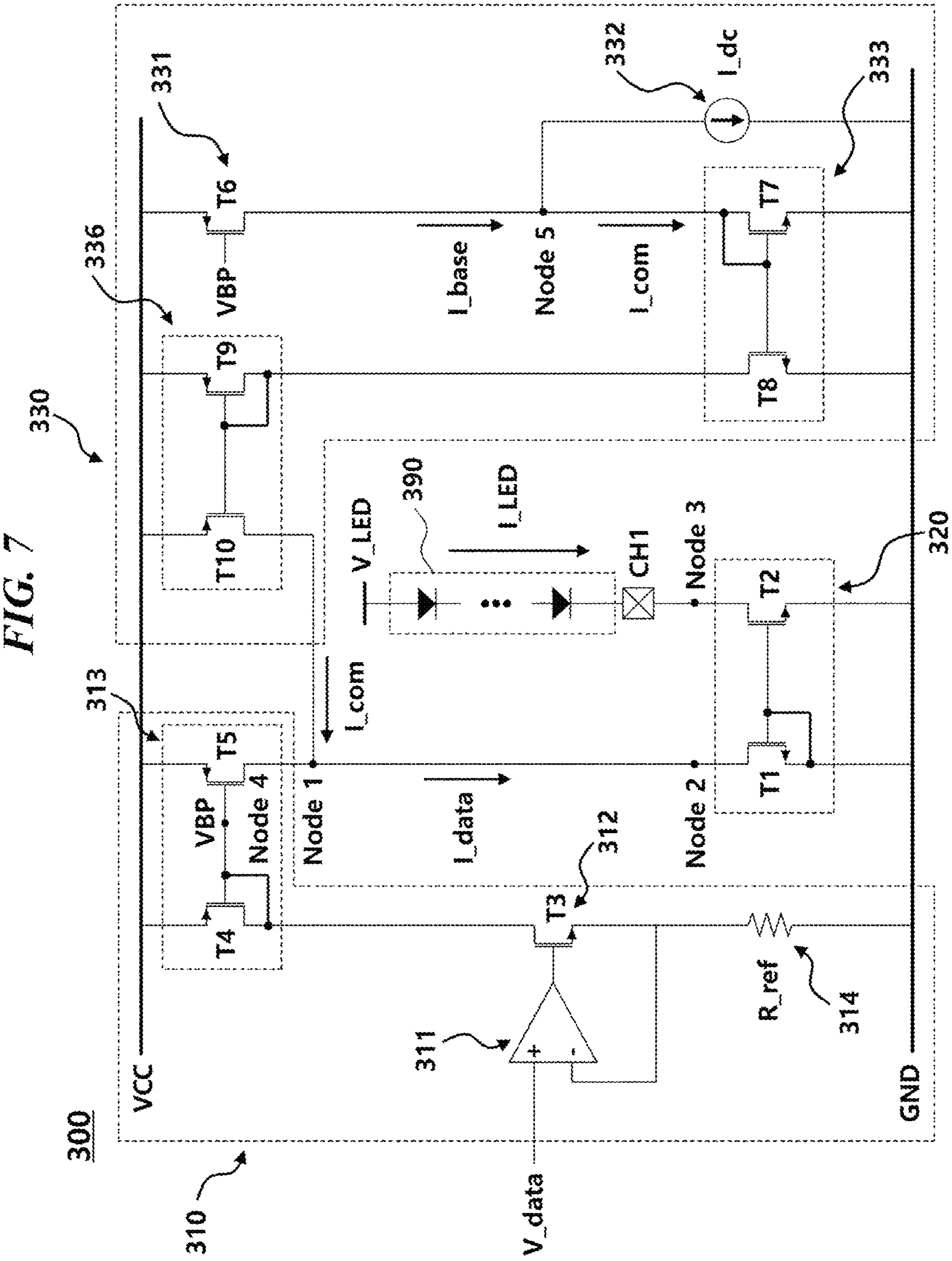
FIG. 7 is a second exemplary diagram of the current supply circuit according to an embodiment of the present disclosure.

FIG. 7 is a second exemplary diagram of the current supply circuit according to an embodiment of the present disclosure.

Referring to FIG. 7, the current supply circuit 300 may include a voltage/current converter 310, a first current mirror circuit 320, a compensation current generation circuit 330, etc.

The first current mirror circuit 320 may output a data current (I_data) to an LED by mirroring the data current (I_data) through first and second transistors T1 and T2.

The first current mirror circuit 320 may include the first transistor T1 that receives the data current (I_data) and the second transistor T2 that generates an LED current (I_LED). One terminal of the first current mirror circuit 320 may be supplied with a common voltage, for example, a ground voltage (GND) through the first transistor T1.

The gate terminal of the first transistor T1 and the gate terminal of the second transistor T2 may be connected, and thus the first current mirror circuit 320 may supply an LED 390 with the LED current (I_LED) proportional to the data current (I_data).

The voltage/current converter 310 may include an amplifier 311, a third transistor 312, a second current mirror circuit 313, a reference resistor 314, etc.

The amplifier 311 may receive a data voltage (V_data) through a first input terminal thereof, and may output the data voltage (V_data). The amplifier 311 may have a second input terminal connected to the other terminal of the third transistor 312, for example, the drain terminal or source terminal thereof, and may receive a feedback signal.

The third transistor 312 may receive the output voltage of the amplifier through a gate terminal thereof, and may generate a base signal that generates a data current.

The second current mirror circuit 313 may be connected to one terminal of the third transistor 312, for example, the source terminal or drain terminal thereof, and may receive a voltage or a current. Furthermore, the second current mirror circuit 313 may generate the data current (I_data) as a deviation between a voltage formed at one terminal of the third transistor 312 and a power supply voltage (VCC).

The second current mirror circuit 313 may mirror a current that flows into one terminal of the third transistor 312 by fourth and fifth transistors T4 and T5, and may adjust a current amplification ratio.

The compensation current generation circuit 330 may include a sixth transistor 331, a direct current source 332, a third current mirror circuit 333, a fourth current mirror circuit 336, etc.

The gate terminal of the sixth transistor 331 may be connected to or coupled with a common node formed by the gate terminal of the fourth transistor T4 and the gate terminal of the fifth transistor T5, for example, a fourth node Node 4. The sixth transistor 331 may receive the same voltage as a bypass voltage VBP formed at the fourth node Node 4 through the fourth node Node 4, and may perform an operation that is associated with signal intensity and timing of the second current mirror circuit 313. If the bypass voltage VBP of the fourth node Node 4 is changed, a voltage at the gate terminal of the sixth transistor 331 may also be identically changed in association with the changed bypass voltage VBP.

The sixth transistor 331 may perform separate driving separately from the bypass voltage VBP of the fourth node Node 4.

The direct current source 332 may supply a direct current (I_dc) to one terminal of the sixth transistor 331, for example, a fifth node Node 5. A compensation current (I_com) may be generated by a base current (I_base) that is supplied by the sixth transistor 331 and the direct current (I_dc) of the direct current source.

The third and fourth current mirror circuits 333 and 336 may generate a compensated data current (I_data) by outputting, to a first node Node 1, a current having the same size as the compensation current (I_com) and/or given correlation therewith.

In this case, one terminal of each of the third transistor 333 and the direct current source 332 may be supplied with a common voltage, for example, the ground voltage (GND). One terminal of each of the fourth transistor T4 and the sixth transistor 331 may be supplied with a common voltage, for example, the power supply voltage (VCC).

Figure 8:
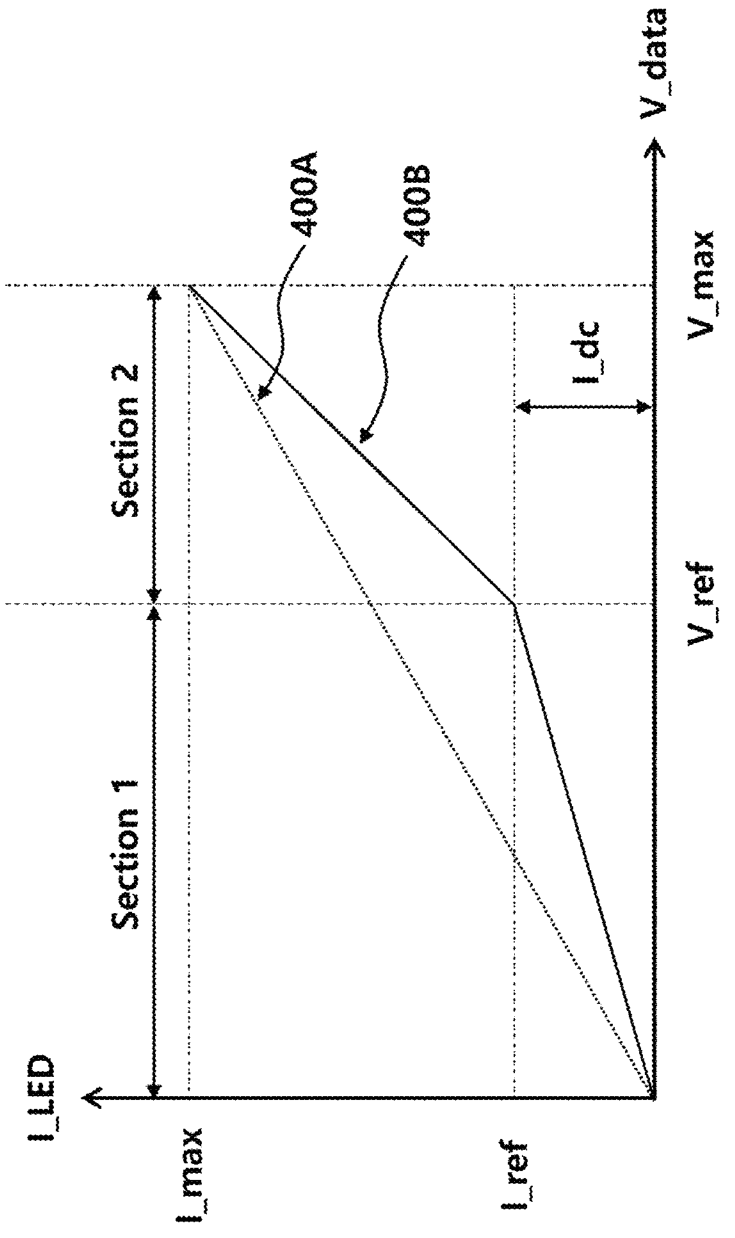
FIG. 8 is a diagram illustrating correlation between a data voltage and a data current according to an embodiment of the present disclosure.

FIG. 8 is a diagram illustrating correlation between a data voltage and a data current according to an embodiment of the present disclosure.

Referring to FIG. 8, correlations between the data voltage (V_data) and the data current (I_data) may be compared. FIG. 8 may be a graph into which an operation of the current supply circuit or the data processing circuit in FIGS. 1 to 7 has been incorporated.

In a current supply circuit to which the voltage/current converter of FIG. 4 has been applied, the data voltage (V_data) and the data current (I_data) may be illustrated in the form of a graph having linear correlation (400A).

In this case, the data current (I_data) is determined by the data voltage (V_data) and the reference resistance R_ref. Accordingly, a change in the correlation between the data voltage (V_data) and the data current (I_data) is limited without a separate operation. In particular, in a low greyscale section and a high greyscale section, the same resolution characteristics, for example, a characteristic in which a change rate of the data current (I_data) according to a change in the data voltage (V_data) is constant is maintained.

In a current supply circuit to which the voltage/current converter and compensation current generation circuit of FIG. 7 have been applied, the data voltage (V_data) and the data current (I_data) may have linear correlation for each section, and may be illustrated by changing the locations of a gradient and a graph for each section and illustrated (400B).

For example, a reference voltage (V_ref) and a reference current (I_ref) may be defined, and the graph of the LED current (I_LED) may be adjusted based on the reference voltage (V_ref) and a reference current (I_ref).

In a low greyscale section, for example, a first greyscale section (Section 1), a change in the data voltage (V_data) versus the LED current (I_LED) may be reduced by reducing the ratio of current mirroring so that high current resolution is obtained. Accordingly, current resolution can be improved.

The first greyscale section (Section 1) may be a voltage range having a section of the reference voltage (V_ref) or less. In this case, a first compensation current having a first gradient may be generated.

In a high greyscale section, for example, a second greyscale section (Section 2), the LED driving area of the high greyscale section may be implemented by additionally supplying the LED current (I_LED) that has been reduced in the low greyscale section through the compensation current generation circuit (not illustrated).

In the high greyscale section, a change in the data voltage (V_data) versus the LED current (I_LED) can be increased, and a current corresponding to the direct current (I_dc) can be further supplied.

The second greyscale section (Section 2) may be a voltage range having a section greater than the reference voltage (V_ref). In this case, a second compensation current having a second gradient may be generated. In this case, the second gradient may be greater than the first gradient.

The first greyscale section and the second greyscale section may form one contiguous greyscale section. The data current (I_Data) according to a change in the data voltage (V_data) may indicate a contiguous graph.

As in FIG. 8, the LED current (I_LED) having a different current gradient for each greyscale section can be continuously implemented in accordance with a change in the data voltage (V_data) by adjusting the intensity of the LED current (I_LED) for each greyscale section. Furthermore, a current gradient for each greyscale section may have the same current gradient, if necessary, and may be specified based on a current mirroring ratio.

The LED driving area may have a driving area that is specified as a maximum data voltage (V_max) and a maximum LED current (I_max) and may be implemented by optimizing an operation range within the LED driving area by using the aforementioned method.

In this case, the greyscale section may be a section that is specified by a greyscale value of an LED array or pixel. The data current (I_data) or the LED current (I_LED) may be specified by the reference voltage (V_ref) and the reference current (I_ref) that implement the greyscale value, that is, a base.

In FIG. 8, the data current (I_data) or the LED current (I_LED) is a current that is the same or has given correlation therebetween. Accordingly, the terms may be interchangeably used or may be replaced with each other and used.

Furthermore, in FIG. 8, the correlation between the voltages/currents that have been linearly illustrated may also be applied to a case the voltages/currents have a non-linear relation. A similar technical spirit may be applied by a plurality of sections and a plurality of inflection points that are defined by a plurality of reference voltages and reference currents.

Figure 9:
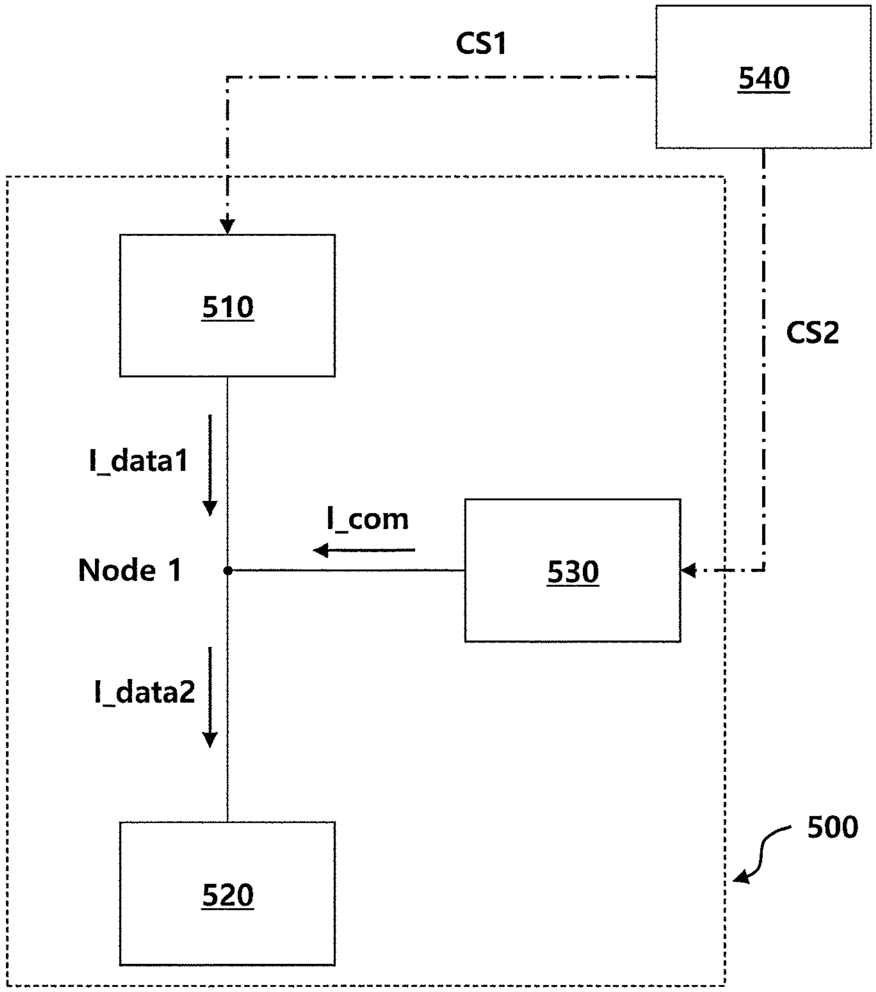
FIG. 9 is a diagram for describing a method of controlling, by a data processing circuit, a current supply circuit according to an embodiment of the present disclosure.

FIG. 9 is a diagram for describing a method of controlling, by the data processing circuit, a current supply circuit of according to an embodiment of the present disclosure.

Referring to FIG. 9, a data processing circuit 540 may control an operation of each circuit by transmitting control signals CS1 and CS2 of a voltage/current converter 510 and a compensation current generation circuit 530.

A current supply circuit 500 of a display device may include a first current mirror circuit 520, the voltage/current converter 510, the compensation current generation circuit 530, etc.

The voltage/current converter 510 may convert, into a first data current (I_data1), a data voltage transmitted by a data driving circuit through a data line, and may further include a current mirror circuit (not illustrated) capable of adjusting the ratio of a second data current (I_data2).

The first current mirror circuit 520 may generate an LED current corresponding to the second data current (I_data2).

The compensation current generation circuit 530 may supply the first current mirror circuit 520 with a compensation current (I_com). The compensation current generation circuit 530 may further include a direct current source (not illustrated) for supplying a direct current and a third current mirror circuit (not illustrated) for generating the compensation current (I_com) corresponding to the direct current.

The data processing circuit 540 may directly control a data driving circuit (not illustrated), or may change brightness of an LED by controlling the current supply circuit 500.

The data processing circuit 540 may control an LED current (I_LED) by transmitting, to the current supply circuit 500, current control signals CS1 and CS2 that change the first and second data currents (I_data1 and I_data2) or the compensation current (I_com).

The data processing circuit 540 may control the compensation current (I_com) by transmitting a control signal that adjusts the level of a direct current that is supplied by the direct current source of the compensation current generation circuit 530.

The data currents (I_data1 and I_data2) may be determined based on a greyscale value of an LED or pixel. The data processing circuit 540 may determine the data currents (I_data1 and I_data2) so that the gradient of a data voltage-data current in a low greyscale section having a reference greyscale value or less is smaller than the gradient of a data voltage-data current in a high greyscale section having more than the reference greyscale value.

Furthermore, the data processing circuit 540 may determine and control the sizes and gradients of the data currents (I_data1 and I_data2) and the compensation current (I_com) based on data related to a preset reference data voltage and a preset reference data current.

What is claimed is:

1. A current supply circuit comprising:
- a voltage/current converter configured to convert a data voltage, received from a data driving circuit, into a data current; and
- a first current mirror circuit configured to mirror the data current so that a light-emitting diode (LED) current flows into an LED array; and
- a compensation current generation circuit connected to the voltage/current converter and configured to adjust the data current transmitted to the first current mirror circuit, wherein
- the data current has a first change rate in a first greyscale section and a second change rate in a second greyscale section in relation to the data voltage, and
- the compensation current generation circuit includes a first current source comprising a transistor configured to output a base current defined by the data voltage, and a second current source configured to form a common node by being electrically connected to one terminal of the first current source and to output a direct current.

2. The current supply circuit of claim 1, wherein:
- the first and second change rates of the data currents in the first greyscale section and the second greyscale section are determined based on a reference data current and a reference data voltage; and
- the first and second change rates of the data currents in the first greyscale section and the second greyscale section are different from each other.

3. The current supply circuit of claim 1, wherein the compensation current generation circuit is configured to:
- obtain a compensation current, which is a sum of output currents of the first current source and the second current source, and
- mirror the compensation current by a plurality of transistors to output mirrored currents.

4. The current supply circuit of claim 1, wherein the first current mirror circuit comprises:
- a first transistor configured to receive the data current; and
- a second transistor connected to a gate terminal of the first transistor and configured to output the LED current corresponding to the data current,
- wherein one terminal of the first transistor is connected to the gate terminal of the first transistor and a gate terminal of the second transistor in common.

5. The current supply circuit of claim 1, wherein the voltage/current converter comprises:
- an amplifier configured to receive the data voltage through a first input terminal thereof;
- a third transistor configured to receive an output voltage of the amplifier through a gate terminal thereof; and
- a reference resistor connected to a second input terminal of the amplifier and one terminal of the third transistor in common.

6. The current supply circuit of claim 5, wherein the voltage/current converter further comprises a second current mirror circuit configured to generate the data current by mirroring a current that flows into another terminal of the third transistor.

7. The current supply circuit of claim 1, wherein the voltage/current converter and the first current mirror circuit are configured to receive voltages having an identical level, each through one terminal thereof.

8. A current supply circuit comprising:
- a first current mirror circuit configured to mirror a data current through first and second transistors and to output a mirrored data current to a light-emitting diode (LED);
- a voltage/current converter comprising an amplifier configured to receive a data voltage through a first input terminal thereof and to output the data voltage and a third transistor configured to receive the data voltage output from the amplifier through a gate terminal thereof and to generate the data current; and
- a compensation current generation circuit configured to change the data current by supplying a compensation current to the first current mirror circuit, wherein
- the compensation current generation circuit includes a first current source comprising a transistor configured to output a base current defined by a data voltage, and a second current source configured to form a common node by being electrically connected to one terminal of the first current source and to output a direct current.

9. The current supply circuit of claim 8, wherein the first current mirror circuit comprises:
- a first transistor configured to receive the data current; and
- a second transistor comprising one terminal, through which a same voltage as the first transistor is received, and a gate terminal connected to a gate terminal of the first transistor and to supply the LED with an LED current proportional to the data current.

10. The current supply circuit of claim 8, wherein:
- the voltage/current converter further comprises a second current mirror circuit configured to generate the data current based on a difference between a voltage formed at one terminal of the third transistor and a voltage supplied from an external circuit; and
- another terminal of the third transistor is connected to a second input terminal of the amplifier.

11. The current supply circuit of claim 10, wherein:
- the second current mirror circuit is configured to determine a change rate of the data current according to a change in the data voltage; and
- the compensation current generation circuit is configured to determine the level of the compensation current.

12. The current supply circuit of claim 10, wherein:
- the second current mirror circuit comprises a fourth transistor and a fifth transistor; and
- the compensation current generation circuit comprises:
- a sixth transistor connected to a common node formed by a gate terminal of the fourth transistor and a gate terminal of the fifth transistor and configured to change an output voltage thereof based on a bypass voltage formed in the common node;

a direct current source configured to supply a direct current to one terminal of the sixth transistor; and a third current mirror circuit configured to receive an output current of the sixth transistor and the direct current of the direct current source, to generate the compensation current, and to supply the compensation current to the first current mirror circuit.

13. The current supply circuit of claim 8, wherein:

the compensation current generation circuit is configured to generate a first compensation current having a first gradient in a range of voltages equal to or less than a reference voltage and generate a second compensation current having a second gradient in a range of voltages greater than the reference voltage, and the second gradient is steeper than the first gradient.

14. A display device comprising:

a first current mirror circuit configured to generate a light-emitting diode (LED) current corresponding to a data current;

a compensation current generation circuit configured to supply a compensation current to the first current mirror circuit; and a data processing circuit for controlling the LED current transmitted to an LED of the display device, wherein the data processing circuit is configured to control the LED current by transmitting a current control signal to change the data current or the compensation current, and the compensation current generation circuit includes a first current source comprising a transistor configured to output a base current defined by a data voltage, and a second current source configured to form a common node by being electrically connected to one terminal of the first current source and to output a direct current.

15. The display device of claim 14, wherein:

the display device further comprises a voltage/current converter configured to convert, into the data current, a data voltage transmitted by a data driving circuit through a data line;

the voltage/current converter comprises a second current mirror circuit configured to generate the data current; and the data processing circuit is configured to control the data current by adjusting a mirroring rate of the second current mirror circuit.

16. The display device of claim 14, wherein the compensation current generation circuit comprises:

a direct current source configured to supply a direct current; and a third current mirror circuit configured to generate the compensation current corresponding to the direct current, wherein the data processing circuit controls the compensation current by adjusting the level of the direct current.

17. The display device of claim 14, wherein:

the data current is determined based on a greyscale value of the LED; and the data processing circuit is configured to determine the data current so that a gradient of a data voltage—a data current in a low greyscale section, where a greyscale value is equal to or less than a reference greyscale value, is gentler than a gradient of a data voltage—a data current in a high greyscale section, where a greyscale value is greater than the reference greyscale value.

18. The display device of claim 14, wherein the data processing circuit is configured to determine levels of the data current and the compensation current based on data relating to a preset reference data voltage and a preset reference data current.

* * * * *